United States Patent [19]

Wunderman et al.

[11] Patent Number: 4,996,949
[45] Date of Patent: Mar. 5, 1991

[54] DISPOSABLE DOG DIAPER

[76] Inventors: Lynn Wunderman; Marc Wunderman, both of 94 Mercer Ave., Hartsdale, N.Y. 10530

[21] Appl. No.: 443,325

[22] Filed: Nov. 30, 1989

[51] Int. Cl.⁵ .................................................. A01K 29/00
[52] U.S. Cl. .................................... 119/143; 604/389
[58] Field of Search ............... 128/157, 165; 604/308, 604/386, 387, 388, 389, 390, 393, 394, 407; 119/95, 143

[56] References Cited

U.S. PATENT DOCUMENTS

| | | | |
|---|---|---|---|
| 3,141,443 | 7/1964 | Huey | 119/143 |
| 3,738,330 | 6/1973 | Alofsin | 119/143 |
| 4,290,386 | 9/1981 | Eiriksson | 119/95 |
| 4,527,991 | 7/1985 | Msarsa | 604/399 |
| 4,577,591 | 3/1986 | Wesseldine | 604/398 |
| 4,699,622 | 10/1987 | Toussant et al. | 604/389 |
| 4,779,573 | 10/1988 | Vidal | 119/95 |
| 4,813,949 | 3/1989 | O'Rourke | 604/391 |

Primary Examiner—Randall L. Green
Assistant Examiner—K. M. Reichle
Attorney, Agent, or Firm—Walter F. Wessendorf, Jr.

[57] ABSTRACT

A disposable dog diaper for removable emplacement and securement circumferentially about a dog's rear torso and his inguinal region. A lower body sheet and upper body wrapper, together with contact adhesive portions, allow such wrap-around emplacement and securement without slipping, gathering or "bunching up", and, together with removable engagement via the adhesive portions, maximum comfort is afforded the dog. Highly absorbent material fixedly carried by the body sheet absorbs and retains body fluids, such as urine, discharged by the dog.

1 Claim, 1 Drawing Sheet

DISPOSABLE DOG DIAPER

BACKGROUND OF THE INVENTION

1. Technical Field

This invention relates to a disposable dog diaper for removable emplacement circumferentially about the rear torso of a dog and its inguinal region to absorb and retain body fluids, such as urine, discharged by the dog.

2. Background

There is a need for a disposable dog diaper for relatively simple and easy emplacement circumferentially about the dog's rear torso and its inguinal region to absorb and retain body fluids, such as urine, discharged by the dog to prevent soiling while traveling, to prevent soiling of carpets and furniture, and to dissipate the effects which would otherwise be present of odors and unsanitary conditions from such discharges.

SUMMARY OF THE INVENTION

This invention contributes to the solution of the discussed problem by providing a waterproof, disposable dog diaper whose associated structures and functional attributes permit relatively simple and easy emplacement circumferentially about the dog's rear torso and inguinal region to absorb and retain body fluids discharged by the dog.

BRIEF DESCRIPTION OF THE DRAWINGS

These objects and other objects of the invention should be discerned and appreciated from the description of the preferred embodiment taken in conjunction with the drawings, wherein like reference numerals refer to similar parts throughout the several drawing figures, in which.

DESCRIPTION OF THE PREFERRED EMBODIMENT

Figure 1:
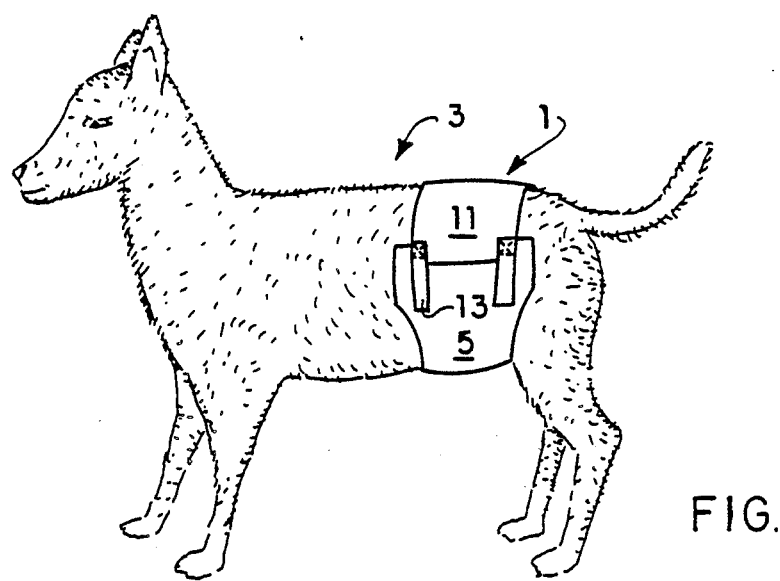
FIG. 1 is a view showing the disposable dog diaper of this invention mounted on a dog.
Figure 2:
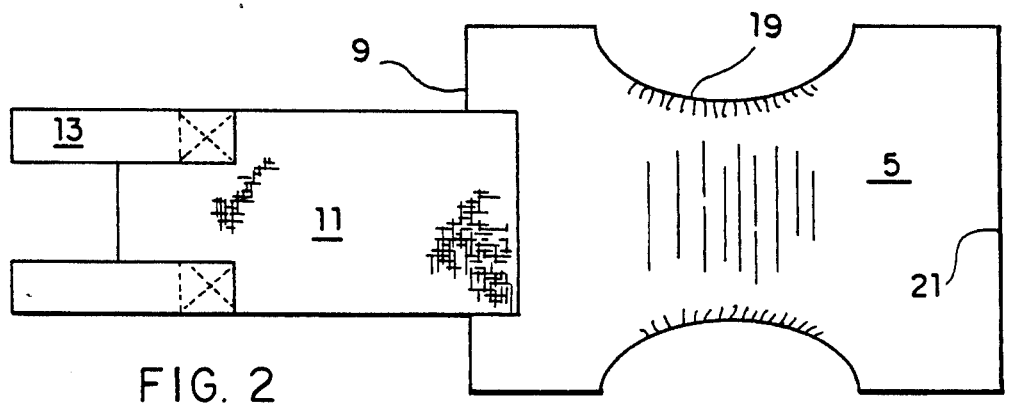
FIGS. 2 and 3 are respective exterior and interior plan views of the diaper.
Figure 3:
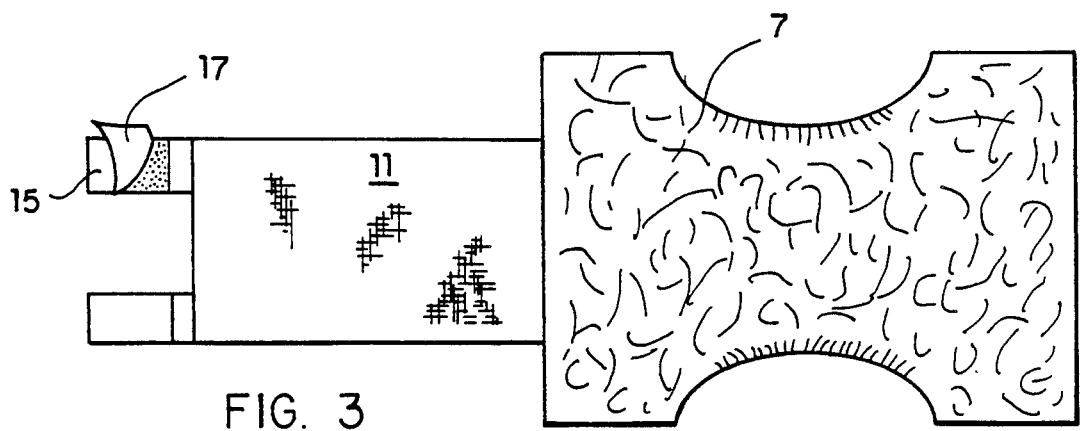

In FIG. 1 of the drawings, reference numeral 1 generally refers to the invention of the disposable dog diaper shown mounted on the rear torso of a dog and covering his inguinal region. The diaper 1 comprises a flat, exterior lower body sheet 5 that is flexible and is made of suitable waterproof plastic material. Body sheet 5 fixedly carries in superposed relationship suitable, highly absorbent material 7. Extending from a lateral side 9 of body sheet 5 is a flat, flexible upper body wrapper 11 of rectangular configuration. Two flat, flexible mounting straps 13 extend laterally from upper body wrapper 11. The distal ends 15 of the mounting straps 13 have contact adhesive portions covered by removable strip tabs 17. THe longitudinal ends 19 of body sheet 5 are suitably gathered to allow comfortable and complemental emplacement of the body sheet 5 against the dog's lower rear torso with the highly absorbent material 7 interfacing with the dog's lower rear torso and inguinal region. Upon total and complete emplacement and engagement of the diaper 1 against the dog's rear torso, the upper body wrapper 11 wraps around the dog's upper rear torso to effect therewith comfortable emplacement and engagement without the upper body wrapper 11 slipping, gathering or otherwise "bunching up" in consequence from the dog's running movements or other movements. The strip tabs 17 are removable by hand to expose the contact adhesive portions on the distal ends 15. These contact adhesive portions are removably engaged with the other lateral side 21 of the body sheet 5 by suitable and sufficient pressure applied against the distal ends 15 of the mounting straps 13. The highly absorbent material 7 absorbs and retains body fluids, such as urine, discharged by the dog 3 and the body sheet 5 prevents any leakage of such absorbed fluids. The wrap-around feature of the upper body wrapper 11, together with infinite adjustment afforded by the contact adhesive portions, provides the phenomenon of both removable emplacement and securement of the dog diaper 1 functionally on the one hand, and maximum comfort for the dog 3 on the other. After the diaper 1 has been soiled, it can be easily and simply replaced by a new one. The diaper 1 is easy to attach because it requires only minimal cooperation from the dog. The diaper is attached while the dog is standing and facing away from the human operator effecting such attachment. It is not necessary to effect any special positioning of the dog's legs or other body parts, and the diaper 1 will produce satisfactory results with a relatively broad range of positions. The diaper 1 is attached around the dog's torso, not around or through the dog's legs, as, for example, is the case with a human infant's diaper. As a result, the dog's natural range of movements are not restricted, to wit: the dog can stand, even on its hind legs, sit, lie down, walk and even run naturally. These functional attributes of the diaper 1 contribute to the dog's comfort and thereby reduce the likelihood of the dog's attempts to remove or destroy the diaper 1, either of which would reduce the efficacy of the diaper 1.

We claim:

1. A disposable dog diaper for removable emplacement circumferentially about and securement with the rear torso of a male dog and his inguinal region, said disposable dog diaper being of integral, one-piece construction and comprising:

absorbent material means, interfacing with the dog's lower rear torso and inguinal region, for keeping the dog's lower rear torso and inguinal region dry by absorbing and retaining urine discharged by the dog and dissipating the effects of odors and unsanitary conditions from the dog's urine discharges, said absorbent material means being formed of flat, flexible material and being generally rectangular in shape;

exterior sheet means, fixedly supporting said absorbent material means thereon in superposed relationship and engaging the dog's lower rear torso and inguinal region, for preventing external soiling from the dog's urine discharges, said sheet means being formed of flat, flexible, waterproof material and being generally rectangular in shape, said sheet means including longitudinal ends, lateral sides which are shorter in length than said longitudinal ends, an axis extending between said sides, and gathering means on said ends for allowing comfortable and complemental emplacement and engagement of said sheet means against the dog's lower rear torso and inguinal region;

wrapper means for wrapping around and effecting comfortable and complemental emplacement and engagement against the dog's upper rear torso without slipping, gathering or bunching up as a consequence of any of the dog's movements, said wrapper means being formed of flat, flexible material and being generally rectangular in shape, said wrapper means including longitudinal ends, lateral sides and an axis extending between said sides, said wrapper means ends and sides being shorter than those of said sheet means and one of the lateral sides of said wrapper means coaxially attached to one of said sides of said sheet means; and two strap means for infinite adjustment and removeable engagement and securement with the other of said lateral sides of said sheet means, each strap means having a proximal end secured to the other lateral side of said wrapper means and a distal end with contact adhesive means and said ends being shorter in length than the lateral sides of said wrapper means.

* * * * *